United States Patent
Leach et al.

(10) Patent No.: US 6,171,534 B1
(45) Date of Patent: Jan. 9, 2001

(54) METHOD OF MAKING A SPEAKER CONE AND SURROUND ASSEMBLY

(76) Inventors: Patrick Arthur Leach; David Ian Leach, both c/o T.T. Plastics, St. Margaret's Way, Stukeley Meadows Industrial Estate, Huntingdon, Cambridgeshire, PE18 6EB (GB)

( * ) Notice: Under 35 U.S.C. 154(b), the term of this patent shall be extended for 0 days.

(21) Appl. No.: 08/004,254

(22) Filed: Jan. 14, 1993

(30) Foreign Application Priority Data

Jan. 15, 1992 (GB) .................................................. 9200774
Apr. 30, 1992 (GB) .................................................. 9209345
Oct. 8, 1992 (GB) .................................................. 9221133

(51) Int. Cl.[7] ........................... B29C 45/14; B29C 37/02
(52) U.S. Cl. ........................ 264/102; 264/161; 264/254; 264/261; 264/276
(58) Field of Search .............................. 264/328.9, 546, 264/511, 571, 102, 328.12, 276, 161, 250, 261, 277, 252, 254

(56) References Cited

U.S. PATENT DOCUMENTS

| | | |
|---|---|---|
| 3,150,441 | 9/1964 | Kloss . |
| 3,573,396 * | 4/1971 | Schoengold ................... 179/115.5 R |
| 3,612,783 | 10/1971 | Schneider . |
| 3,684,052 | 8/1972 | Sotome . |
| 4,029,911 | 6/1977 | Albinger . |
| 4,158,756 | 6/1979 | Keezer . |
| 4,190,746 | 2/1980 | Harwood et al. . |
| 4,384,174 | 5/1983 | Suzuki et al. . |
| 4,517,416 | 5/1985 | Goossens . |
| 4,520,237 | 5/1985 | Murakami . |
| 4,755,339 * | 7/1988 | Reilly et al. ........................... 264/255 |
| 4,793,793 * | 12/1988 | Swenson et al. ..................... 264/511 |
| 4,894,192 | 1/1990 | Warych . |
| 5,096,651 * | 3/1992 | le Comte .............................. 264/511 |
| 5,099,949 | 3/1992 | Mitobe . |
| 5,115,510 | 5/1992 | Mitobe . |
| 5,220,863 * | 6/1993 | Scott et al. ............................ 264/268 |

FOREIGN PATENT DOCUMENTS

| | | |
|---|---|---|
| 30 18 790 | 11/1981 | (DE) . |
| 32 41 757 | 5/1984 | (DE) . |
| 2056817 | 3/1981 | (GB) . |
| 1604934 | 12/1981 | (GB) . |
| 2228391 | 8/1990 | (GB) . |
| 55-74297 | 6/1980 | (JP) . |
| 5-574297 * | 6/1980 | (JP) . |
| 58-201496 | 6/1984 | (JP) . |
| PCT/EP89/01073 | 4/1990 | (WO) . |

OTHER PUBLICATIONS

D. Rosato and D. Rosato, Injection Molding Handbook, Co. 1986, Reinhold Company, pp 183–186.*

* cited by examiner

Primary Examiner—Angela Ortiz
(74) Attorney, Agent, or Firm—Jacobson, Price, Holman & Stern, PLLC

(57) ABSTRACT

A method of making a loudspeaker cone and surround assembly comprises clamping at least the outer marginal edge of a cone in a mold having a cavity defining a surround and injecting an elastomeric material into the cavity through an annular orifice extending substantially continuously around the said marginal outer edge to form a surround attached to the outer marginal edge of the cone. The method includes the step of feeding the elastomeric material to the annular orifice through an annular feed chamber extending around the mold cavity. The annular orifice may be narrow in width in comparison to the thickness of the surround and the method may comprise the step of separating the surround from an annular ring of sprue formed by elastomer which has solidified in or outside the annular orifice by tearing while the elastomer is still hot from the injection molding step.

16 Claims, 4 Drawing Sheets

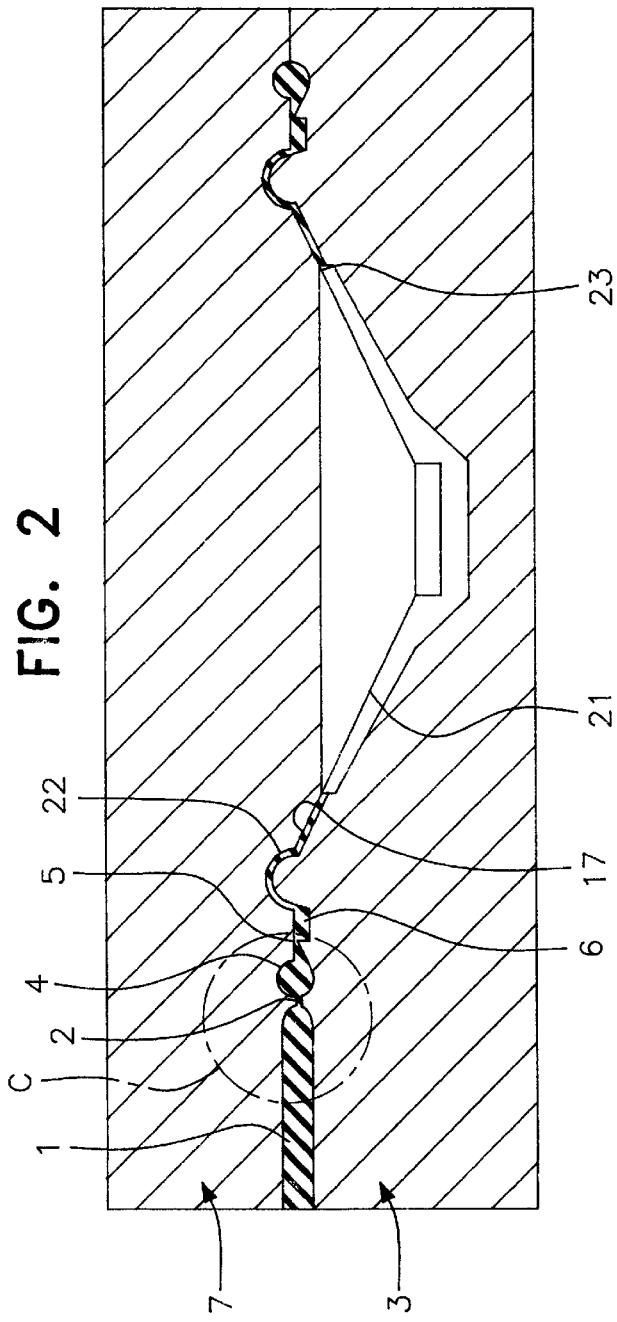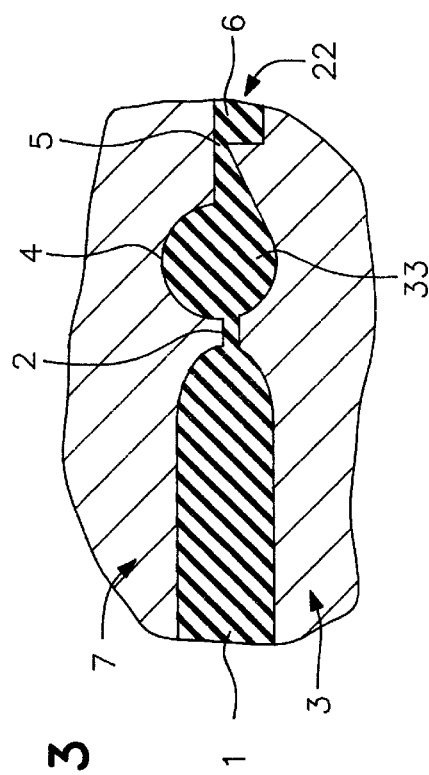

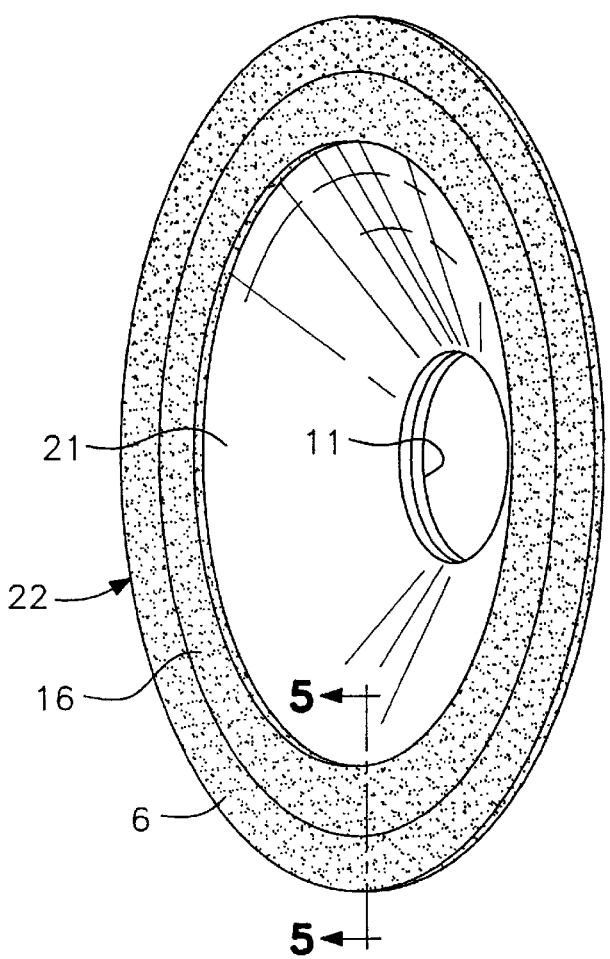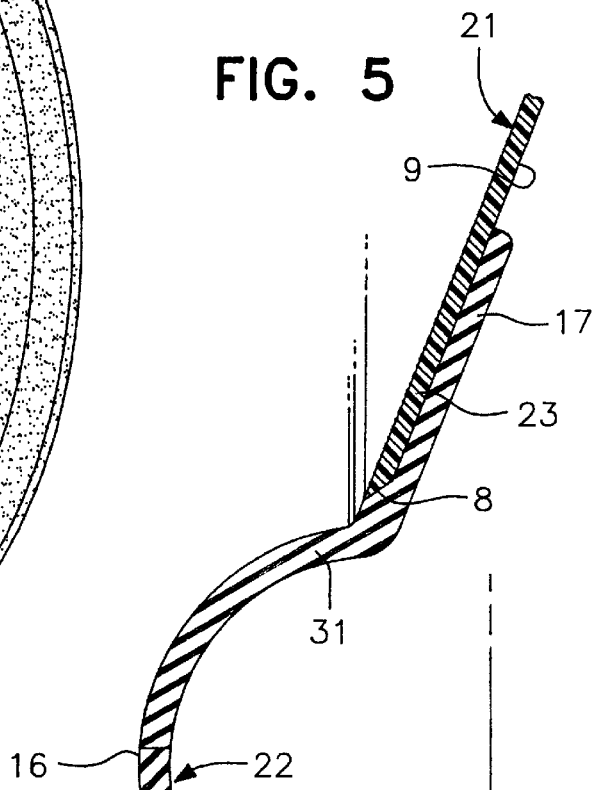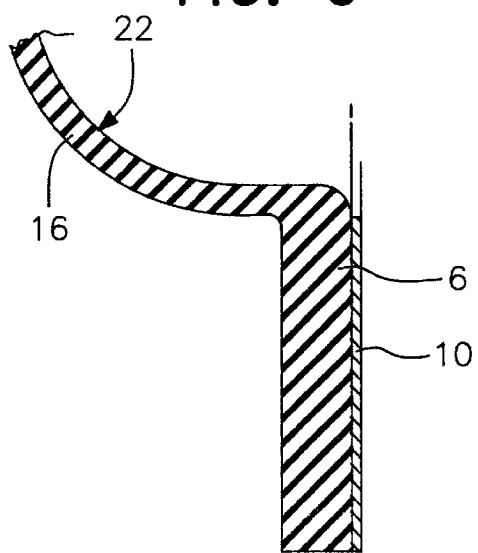

ical suspensions are compression moulded from thermosetting elastomeric materials and are secured to the material of the cone with the aid of an adhesive. This requires skilled hand assembly to ensure concentricity and a reliable bond and is thus slow and expensive. This form of assembly is however usually justified by the improved acoustic performance which results from the provision of a compliant suspension for the cone.

METHOD OF MAKING A SPEAKER CONE AND SURROUND ASSEMBLY

DESCRIPTION

The invention relates to loudspeakers and more particularly to drive units for loudspeakers.

It is known to make the cones of loudspeakers from materials such as paper, plastics and metal sheet, although increasingly the chosen material is a plastics material such as polypropylene since this material has good characteristics for this particular use.

Speaker cones are normally provided with a peripheral suspension in the form of a corrugated member of flexible rubber or other elastomeric material and which is sometimes known as a roll surround or simply as a surround. Conventionally such elastomeric suspensions are compression moulded from thermosetting elastomeric materials and are secured to the material of the cone with the aid of an adhesive. This requires skilled hand assembly to ensure concentricity and a reliable bond and is thus slow and expensive. This form of assembly is however usually justified by the improved acoustic performance which results from the provision of a compliant suspension for the cone.

It is a general object of the invention to provide a loudspeaker cone and suspension or surround assembly which can be made without the need for hand assembly so that variations in manufacture and thus in performance, which have previously been commonplace, can be avoided or at least mitigated.

Many attempts have been made to produce a loudspeaker cone and surround assembly directly by injection moulding one onto the other to avoid the need for costly hand assembly of the two components, see for example GB-A-2228391 of Pioneer. Although in theory the manufacturing technique involved appears to be simple, in practice this is not the case. This is probably due to the fact that it is particularly difficult to injection mould an elastomer to form a surround because of the poor flow characteristics of molten elastomers when moulding components of thin cross-section such as are involved in a loudspeaker suspension. Ordinary injection moulding techniques produce a surround which is lacking in concentricity and uniformity of cross-section and which is not flat at its outer margin. This is unacceptable. Our early experiments attempted to remedy these deficiencies by simultaneously injecting the elastomer at multiple positions around the periphery of the cone but still failed to provide the whole answer.

It is an object of the invention to provide a method by which an elastomeric surround can be injection moulded onto an injection moulded cone to provide a surround which is of an improved standard.

It is another object of the invention to provide a loudspeaker drive unit which requires a minimum of hand assembly so that variations in manufacture and thus in performance, which have previously been commonplace, can be avoided or at least mitigated.

According to the invention, a method of making a loudspeaker cone and surround assembly comprises clamping at least the outer marginal edge of a cone in a mould having a cavity defining a surround and injecting an elastomeric material into the cavity through an annular orifice extending substantially continuously around the said marginal outer edge to form a surround attached to the outer marginal edge of the cone. Preferably the elastomeric material is fed to the annular orifice through an annular feed chamber extending around the mould cavity.

Preferably the annular orifice is narrow in width in comparison to the thickness of the surround and preferably the method comprises the step of separating the surround from an annular ring of sprue formed by elastomer which has solidified in or outside the annular orifice by tearing while the elastomer is still hot from the injection moulding step.

If desired the surround may be formed in two or more separate steps each as described above, to create a surround consisting of two or more annular bands or zones of elastomer which may, for example, be of different physical characteristics or colour.

Preferably the method comprises the step of evacuating air from the cavity prior to the injection of elastomer. The method may comprise the step of placing a paper or the like gasket into the cavity prior to the injection of elastomer whereby the gasket is directly attached to the surround. In this case a vacuum can be applied to the cavity through the gasket to prevent the elastomer from being drawn into the vacuum ports.

Preferably the cone is an injection moulding. Preferably the material of the cone and the material of the surround are chosen such that when the surround is injected onto the cone, the two are united or bonded chemically, that is to say they become attached at a molecular level due to cross-linking of the respective materials.

The cone may be of polypropylene and may be a homopolymer or co-polymer and may comprise a proportion of a filler such as mica. The plastics material will preferably have a high melt flow index to allow the material to be moulded in a cavity having a thin section.

The elastomer of the suspension is preferably a styrene-ethylene butylene-styrene polymer such as that sold by Evode Plastics Limited under their registered trademark Evoprene G. Preferably the elastomer has a shore A hardness below 50.

The method may comprise the step of placing a rigid chassis component into the cavity prior to the injection of elastomer whereby the chassis component becomes directly attached to the surround. Preferably the chassis component is formed by injection moulding, and may be annular in shape. Preferably the method comprises the step of choosing the material of the rigid chassis component such that when the material of the surround is injected onto the chassis component, the two are united or bonded chemically, that is to say, they become attached at a molecular level due to cross-linking of the respective materials.

From another aspect the invention is injection moulding apparatus for carrying out the method referred-to above, comprising mould parts defining a surround and for receiving at least the marginal outer edge of a cone, the mould parts being movable in one direction to close the mould and in another direction to open the mould to clamp the said cone edge and to allow access to the mould cavity, means formed between the mould parts and extending substantially continuously round the cavity defining an annular feed chamber for molten elastomer, and a substantially continuous annular injection port communicating between the annular feed chamber and the cavity. Preferably the substantially continuous annular injection port is formed by a small gap between the mould parts so that the injection port is in the form of a narrow slit through which the molten elastomer enters the mould cavity radially from the feed chamber. The feed chamber is preferably large in cross-section compared to the annular injection port which will be small in width compared to the width or thickness of the cavity. Preferably the annular feed chamber will be fed from a single radially extending feed port via a constricted section of reduced cross-section which forms a 'gate' controlling the flow of molten elastomer to the cavity. Preferably this constricted section splays-out laterally in a direction towards the annular feed chamber to assist the molten elastomer to flow round the path.

From a further aspect, the invention is a loudspeaker cone and surround assembly made by the method described above.

From another aspect the invention is a loudspeaker drive unit comprising a cone suspension e.g. of an elastomeric material, moulded integrally with a rigid annular chassis front member. Preferably the annular chassis front member, which may be moulded from a material such as polypropylene, is arranged to surround the cone suspension. Preferably the cone suspension and the cone are moulded integrally. The material of the suspension is preferably arranged to overlie an axial face of the annular chassis front member and is formed with a raised annular bead which can form a compressible water and/or air seal when the drive unit is installed. The suspension material may be moulded to embrace both opposite axial faces of the annular chassis front member, and may be formed with annular beads on both opposite faces.

The annular chassis front member may be moulded with lugs by which the annular chassis front member can be attached to the rear portion of the chassis, or alternatively the annular member may be formed with recesses for receiving fixing members, e.g. screws, by which the rear portion of the chassis frame is attached to the annular chassis front member.

Preferably the rear portion of the chassis comprises an annular rear member formed integrally with a series of legs by which the rear portion is connected to the annular chassis front member. The chassis may be made from a plastics material such a polypropylene. Advantageously the rear cone suspension is moulded integrally with chassis e.g. from an elastomeric material.

Preferably the cone suspension members and chassis are injection moulded. Advantageously the suspension members comprise a styrene-ethylene butylene-styrene polymer whereby the materials of the surround and chassis and suspension become chemically bonded together during the injection moulding steps. This chemical bonding largely obviates the problem of de-lamination which frequently occurs with hand assembled loudspeaker cone and surround assemblies when using adhesives. The chassis components, i.e. the front and rear annular support members, and the chassis legs are moulded from polypropylene filled with mica or the like.

In assembling a loudspeaker drive unit, it is conventional to attach the cone and surround assembly to the chassis or frame with the aid of an adhesive applied to the outer marginal edge of the surround. As an alternative an annular paper ring or gasket can be interposed between the surround and the drive unit chassis. This procedure involves extra work. This is obviated in the present invention since the chassis or a part thereof is formed integrally with the cone suspension.

The polypropylene used for the chassis components may be a homo-polymer or co-polymer and may comprise a proportion e.g. 40% by volume of a filler such as mica.

The invention is diagrammatically illustrated by way of example in the accompanying drawings in which:

FIG. 2 is a cross-sectional side view on the line A—A of FIG. 1;

FIG. 3 is a view of detail C of FIG. 2 to an enlarged scale;

FIG. 4 is a perspective view of a loudspeaker cone and surround assembly made in accordance with the present invention;

FIG. 5 is a scrap cross section of part of the loudspeaker cone and suspension assembly of FIG. 4, and taken on the line B—B of FIG. 4;

FIG. 6 is a scrap cross-sectional view corresponding to FIG. 5 of a modified arrangement;

Figure 1:
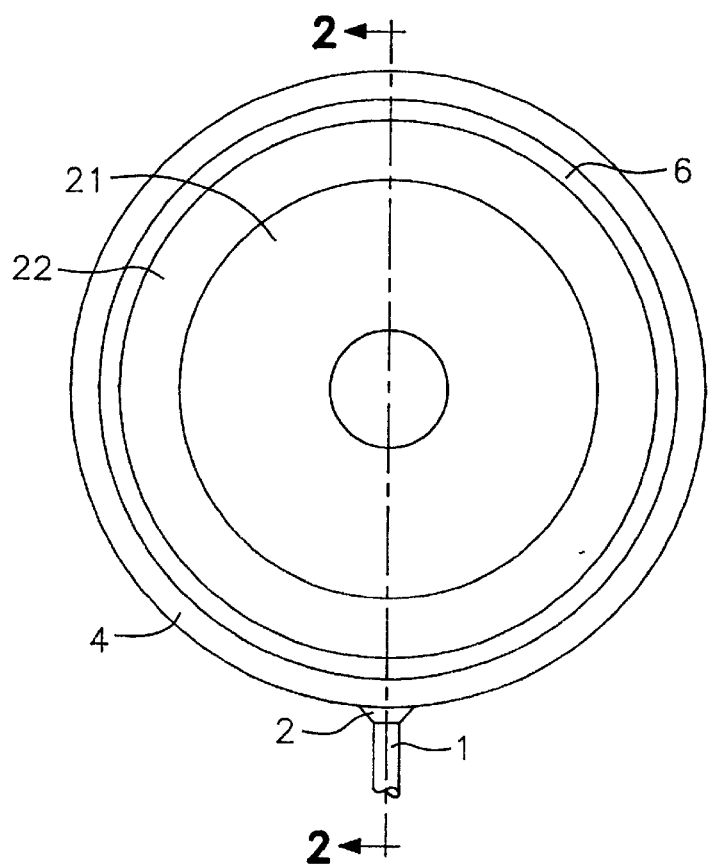
FIG. 1 is a plan view of a female injection mould part for forming a surround or suspension on a loudspeaker cone.

In FIGS. 1 to 3 of the drawings there is shown injection moulding apparatus for making loudspeaker cone and surround assemblies. To injection mould an elastomeric suspension or surround on to the outer periphery of an injection moulded loudspeaker cone, we propose an injection mould having an opposed pair of relatively movable complementary parts 3 and 7, only the female part 3 of which is shown in FIG. 1 of the drawings, and both of which are shown in FIG. 2. Rather than attempt to inject the elastomer directly into the cavity formed between the two mould parts 3 and 7 and which defines the shape of the surround or suspension to be injection moulded onto the outer peripheral edge 23 of an injection moulded cone 21 clamped between the mould parts and extending into the surround defining cavity, we instead inject the molten elastomer via a port 1 through a control gate 2, which is a constriction which in plan view shown in FIG. 1 fans out sideways as it approaches an annular flow path or feeder 4 which extends continuously around the surround-forming cavity at a position closely adjacent to the outer edge of the cavity. The molten elastomer then enters the cavity radially through a narrow "knife edge" gate 5 extending continuously round the outer edge of the cavity. In this way the cavity is filled evenly and simultaneously at all positions around its periphery. Thus the cavity fills with elastomer to form a surround 22 having an outer flange 6 which is thick in comparison to the thickness or width of the gate 5, and an inner flange 17 attached to the outer margin of the cone 21.

It will be seen from FIG. 3 that when the elastomer in the filled mould has solidified to form a surround 22 molecularly bonded by cross-linking to the material of the cone 21, the outer flange 6 of the surround will have an attached annular sprue 23 of rounded cross-section consisting of the solidified elastomer formerly occupying the annular feeder ring. Preferably this is detached immediately the moulded component is removed from the mould i.e. while it is still hot, and at that stage can be done manually by tearing since the elastomer will not have cured fully. We have found that the waste elastomer will separate cleanly from the outer edge of the surround since the thin cross-section of elastomer in the knife edge injection port 5 forms a line of weakness.

The invention thus provides a method and apparatus for injection moulding components consisting of two different plastics materials, e.g. an elastomer on a rigid plastics, including but not limited to loudspeaker cone and surround assemblies.

In FIGS. 4 to 6 of the drawings there is shown a loudspeaker drive cone and surround assembly of generally conventional appearance and comprising a frusto-conical drive cone 21 which, in use, is attached at its inner margin 11 in any convenient manner to a loudspeaker drive motor, e.g. a moving coil, not shown, the outer margin 23 of the cone 21 being attached in the manner described above with reference to FIGS. 1 to 3 to a compliant surround or suspension 22 which in turn is secured in any convenient fashion to a loudspeaker drive unit chassis (not shown). In the present case the loudspeaker drive cone 21 has been injection moulded from polypropylene and the flexible elastomeric surround or suspension 22, which is of generally conventional configuration, has been injection moulded thereon. The surround is annular in shape and comprises an outer flange 6 by which it is attached to the loudspeaker drive unit chassis (not shown), a part circular roll or bellows 16 which is the active part of the cone suspension and an inner flange 17, which is moulded onto the rear face 9 of the cone 21 so as to overlap the outer margin 23 of the cone to some extent. The overlapping joint is thus invisible in use. The outer edge 8 of the cone 21 is preferably positioned closely adjacent to the roll or bellows 16 of the surround 22 so that the surround does not adversely affect the acoustic properties of the cone.

In the arrangement of FIG. 5, the surround 22 is injection moulded in two successive steps, in the first of which the inner annular part 31 is injected directly onto the cone 21, after which in a second step the outer annular part 32 of the surround is injected onto the inner part 31.

Each of these steps will be as described above with reference to FIGS. 1 to 3. In this way the characteristics of the surround can be tailored in any desired fashion so that for example the acoustical properties of the surround can be improved. If desired the inner and outer parts 31,32 of the surround 22 can be of different colours for aesthetic reasons. Also the surround may be moulded in more than two steps, e.g. in three or more steps to achieve a multi-zone surround.

The material of the surround 22 may be a styrene-ethylene butylene-styrene which bonds chemically under the heat and pressure of the injection moulding process to the polypropylene cone to form an integral unit therewith, thereby obviating the need to glue the cone and surround together as has been necessary heretofore. In this way the alignment between the cone and surround can be controlled more predictably than is the case with hand assembly, and the connection between the cone and surround can be achieved consistently.

In the arrangement of FIG. 6, a paper gasket 10 is arranged in the mould prior to the injection moulding of the surround 22, whereby the gasket 10 is bonded to the flange 6. In this way the cone and surround unit can be secured to the chassis (not shown) of a drive unit using conventional, that is, non-harmful, adhesives.

Figure 7:
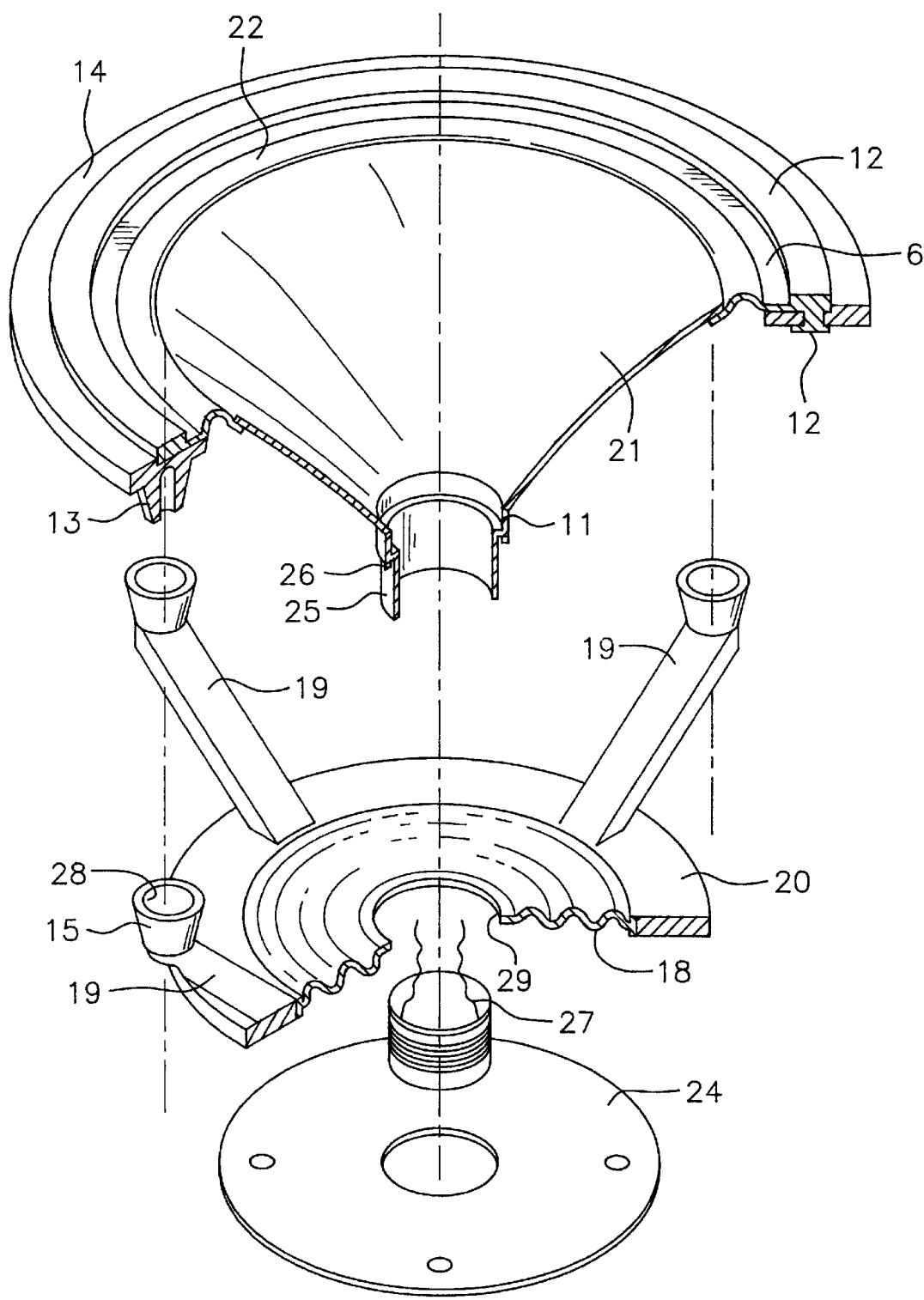
FIG. 7 is a partly sectioned exploded perspective view of a loudspeaker drive unit.

In FIG. 7 of the drawings there is shown in exploded form a loudspeaker drive unit comprising a cone 21, a cone surround or suspension 22 around the outer periphery of the cone and an annular chassis front plate or ring 14 supporting the outer margin 6 of the suspension 22. The chassis front plate 14 is supported on a series of chassis legs 9 attached to, and extending from, an annular rear chassis plate 20. The rear plate 20 carries a rear or inner cone suspension 18 and a magnet plate 24.

The cone 21 and surround 22 are made by injection moulding a thermoplastic injection moulded elastomeric material directly onto a thermoplastic cone to form an integral unit as described above with reference to FIGS. 1 to 3, and in the same moulding step, the elastomeric suspension 22 is moulded directly onto the chassis ring 14 which is itself an injection moulded member of mica-filled polypropylene or the like. The elastomeric material may be extended to form an integral gasket 12 which forms a bead-like flange projecting from both sides of the ring 14 and extending continuously around both sides of the ring. To this end the ring 14 is formed with a series of apertures extending through its surface from side to side to permit the elastomeric material to flow through the ring during the moulding process to form bead-like gaskets on both sides thereof.

The inner periphery 11 of the cone is extended to form a tubular member 25 to facilitate alignment of a voice coil 27. A card or paper ring (not shown) may be moulded into the tubular member 25 to provide a thermal barrier and/or to facilitate attachment of the voice coil 27 using an adhesive. The inner periphery of the cone may also be formed with an annular knife edge or raised bead 26 to facilitate the joining of the cone to the rear suspension 18, e.g by ultrasonic welding or the like.

The rear face of the ring 14 is formed integrally with frusto-conical spigots 13 which are received in correspondingly shaped sockets 28 in bosses 15 formed on the ends of chassis legs 19 and held in position by mechanical fixings such as screws or by welding, adhesives or the like. The legs 19 can be injection moulded integrally on the annular rear chassis plate or ring 20 from a thermoplastic material such as mica-filled polypropylene or alternatively the legs can be made separately and the assembly fixed together e.g. by bolting. It will be appreciated that the chassis could be moulded in other fashions. Thus for example the legs 9 could be moulded on the front ring 14. Alternatively again the chassis could be formed as a cup-like member formed with sufficient louvres to allow air to move freely in response to cone excursions. The rear cone suspension 18 is preferably directly injection moulded onto the near chassis ring 20 from a thermoplastic elastomeric material, such as that used for the surround 22. The moulding method will be as described above with reference to FIGS. 1 to 3.

Figure 8:
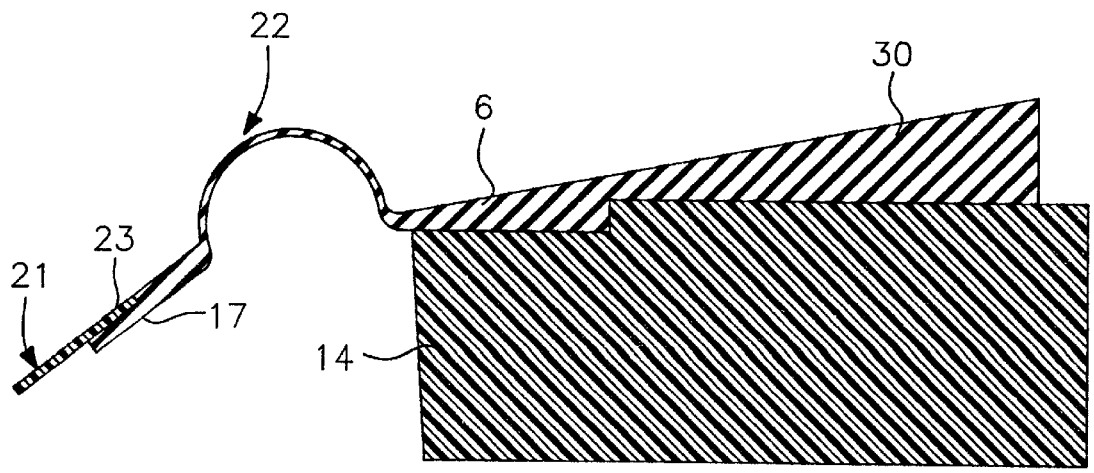
FIG. 8 is a scrap cross-sectional view of the outer edge of a loudspeaker together with its surround or suspension and a moulded-on annular chassis member.

FIG. 8 is a scrap cross-sectional view of the outer periphery 23 of a cone 21 moulded onto a suspension 22 which is moulded onto an annular chassis ring 14. This is achieved in one step by the method described above with reference to FIGS. 1 to 3, except that the mould is adapted to contain both the cone 22 and the ring 14 before the elastomer of the suspension is injected to unite the components. The outer flange 6 of the suspension may be extended at 30 to form the annular feeder channel through which the elastomer is fed around the mould or alternatively or additionally the mould may be provided with a feeder 4 which forms a detachable sprue in the manner described above. A ring 29 can be directly moulded to the inner periphery of the suspension 18 e.g. from plastics or card to facilitate the uniting of the suspension 18 and the cone 21, e.g. by welding or by means of an adhesive.

The magnet plate 24 can be fixed to the rear chassis ring 20 in any suitable fashion, e.g. by an adhesive or by welding or by fixing such a screws or rivets.

The invention thus provides a method by which loudspeaker drive units can be made and assembled using a minimum of hand labour.

We claim:

1. A method of making a speaker cone and surround assembly comprising the steps of:

positioning and retaining the outer marginal edge of a speaker cone in a mold having a cavity defining a surround;

feeding an elastomeric material through a substantially annular feed chamber extending around the mold cavity;

injecting the elastomeric material into the cavity through a substantially annular orifice communicating with the annular feed chamber wherein the orifice extends substantially continuously around the entire outer marginal edge of the speaker cone and is narrow in width in comparison to the thickness of the surround;

uniformly molding the surround attached to the outer marginal edge of the cone;

separating the surround from a ring of solidified sprue formed of the elastomeric material remaining in the annular feed chamber by tearing the sprue from the surround at the narrow junction between the sprue and the surround formed by the annular orifice, the tearing being done while the elastomeric material is still hot from the injection step.

2. A method according to claim 1 wherein molding of the surround is effected in at least two separate molding steps to create a surround consisting of at least two distinct annular bands or zones of elastomeric material.

3. A method according to claim 1 further including the step of creating a vacuum in the cavity prior to the injection of the elastomeric material.

4. A method according to claim 1 further including the step of placing a gasket in the cavity prior to the injection of elastomeric material whereby the gasket becomes directly attached to the surround as a consequence of the injection of the elastomeric material.

5. A method according to claim 4 wherein the vacuum is created by applying a vacuum to the cavity through the gasket.

6. A method according to claim 1 wherein the speaker cone is an injection molding.

7. A method according to claim 1 further including the step of choosing the material of the speaker cone and the material of the surround such that when the surround is injected unto the cone, the two are united chemically so that they become attached at a molecular level due to crosslinking of the respective materials.

8. A method according to claim 1 wherein the speaker cone is a homo-polymer or co-polymer of polypropylene.

9. A method according to claim 1 wherein the elastomeric material is a styrene-ethylene butylene-styrene polymer.

10. A method according to claim 1 further including the step of placing a rigid chassis component into communication with the cavity prior to the injection of elastomeric material whereby said chassis component becomes directly attached to the surround by the elastomeric material.

11. A method according to claim 10 wherein the rigid chassis component is formed by injection molding.

12. A method according to claim 11 wherein the rigid chassis component is annular in shape.

13. A method according to claim 10 further including the step of choosing the material of the rigid chassis component such that when the material of the surround is injected into contact with the rigid chassis component, the rigid chassis component and the surround are united or bonded chemically so that the chassis component and the surround become attached at a molecular level due to cross-linking of the respective materials.

14. A method according to claim 1 wherein the substantially annular orifice is in the shape of a knife edge such that it tapers from a larger width towards the annular feed chamber to a smaller width at the junction with the cavity defining the surround.

15. A method of making a speaker cone and surround assembly comprising the steps of:

positioning and retaining the outer marginal edge of a speaker cone in a mold having a substantially annular cavity defining a surround; and injecting elastomeric material into an annular feed chamber in communication with a radially outward portion of said cavity around substantially the entire outer periphery of said cavity, and from the feed chamber radially inwardly through an annular, tapered, knife edge-shaped orifice that is smaller in width at its narrowest point than the width of the surround, and into said cavity in a direction radially oriented with respect to said speaker cone and then through said cavity in a radially inward direction relative to said cone to uniformly mold a surround bonded to the outer marginal edge of the cone.

16. A method of making a speaker cone and surround assembly comprising the steps of:

positioning the outer periphery of a speaker cone in a mold cavity defining a surround configuration;

injecting melted elastomeric material into said mold cavity through an annular, tapered, knife edge-shaped orifice that is smaller in width at its narrowest point than the surround so that said melted elastomeric material substantially simultaneously flows into contact with the entire outer periphery of the speaker cone positioned in the mold cavity; and permitting said melted elastomeric material to cure and form a surround which is bonded to the outer periphery of said speaker cone.

* * * * *